US012116878B2

(12) United States Patent
Ba et al.

(10) Patent No.: US 12,116,878 B2
(45) Date of Patent: Oct. 15, 2024

(54) WELL CONSTRUCTION WORKFLOW SELECTION AND EXECUTION

(71) Applicant: Schlumberger Technology Corporation, Sugar Land, TX (US)

(72) Inventors: Samba Ba, Beijing (CN); Jean-Pierre Poyet, Houston, TX (US); Jia Xu Liu, Beijing (CN); Jia Yao, Beijing (CN); Pascal Hochart, Beijing (CN); Florian Le Blay, Beijing (CN); Yong Wang, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 174 days.

(21) Appl. No.: 17/516,248

(22) Filed: Nov. 1, 2021

(65) Prior Publication Data

US 2022/0136379 A1    May 5, 2022

Related U.S. Application Data

(60) Provisional application No. 63/198,619, filed on Oct. 30, 2020.

(51) Int. Cl.
*E21B 44/00* (2006.01)
*G06N 20/00* (2019.01)

(52) U.S. Cl.
CPC ............ *E21B 44/00* (2013.01); *G06N 20/00* (2019.01); *E21B 2200/22* (2020.05)

(58) Field of Classification Search
CPC ...... E21B 44/00; E21B 2200/22; E21B 47/00; G06N 20/00
See application file for complete search history.

(56) References Cited

U.S. PATENT DOCUMENTS

| | | | |
|---|---|---|---|
| 2016/0222741 A1 | 8/2016 | Lovorn et al. | |
| 2018/0038992 A1 | 2/2018 | Macdonald et al. | |
| 2018/0284735 A1 | 10/2018 | Cella | |
| 2019/0113651 A1 | 4/2019 | Donderici et al. | |
| 2020/0165910 A1 | 5/2020 | Andresen | |
| 2020/0182038 A1 | 6/2020 | Soukup et al. | |
| 2020/0318474 A1 | 10/2020 | Sonnier | |

FOREIGN PATENT DOCUMENTS

EP    2474706 A2    7/2012

OTHER PUBLICATIONS

Search Report and Written Opinion of International Patent Application No. PCT/US2021/072153 dated Feb. 16, 2022, 11 pages.

*Primary Examiner* — Walter L Lindsay, Jr.
*Assistant Examiner* — Geoffrey T Evans
(74) *Attorney, Agent, or Firm* — Aashish Y. Chawla

(57) ABSTRACT

A method for conducting wellsite activities includes receiving measured sensor data collected by one or more sensors in a wellsite construction rig, determining a data quality of the measured sensor data based on a plurality of data quality dimensions, predicting predicted sensor data using a model, comparing the measured sensor data with the predicted sensor data, determining an uncertainty of the measured sensor data based at least in part on the data quality and the comparison, and selecting one or more workflows for implementation using the one or more sensors, the wellsite construction rig, or both.

15 Claims, 7 Drawing Sheets

WELL CONSTRUCTION WORKFLOW SELECTION AND EXECUTION

CROSS-REFERENCE TO RELATED APPLICATIONS

This application claims priority to U.S. Provisional Patent Application Ser. No. 63/198,619, which was filed on Oct. 30, 2020 and is incorporated herein by reference in its entirety.

BACKGROUND

In the oil and gas field, wells are drilled and constructed according to a variety of workflows. These workflows can include, for example, different drilling modes, casing, cementing, tripping in, reaming, pressure regulation, etc. Generally, the workflows are planned prior to initiating drilling operations. The plans are developed based on the available data, which usually includes data collected from nearby or otherwise similar wells. As part of the workflows, engineers may develop well plans and well programs, define operating envelopes for drilling parameters, update operating procedures, update risk matrices for different (e.g., undesired) events, and initialize parameters for planning models. Data from a variety of sources may thus be checked and used to generate initial plans/models, which are used to select and tailor the workflows.

The workflows are generally modified, initiated, selected, and/or deselected during the actual drilling operations based on real-time feedback. For example, sensors may be employed to measure drilling performance and/or other conditions, and models and parameters may be adjusted, or entire workflows switched, based on the conditions and performance measurements. However, these measurements may not be entirely reliable all the time. For example, incorrect or missing inputs can be experienced, excessive noise, lack of calibration, etc.

SUMMARY

Embodiments of the disclosure include a method for conducting wellsite activities including receiving measured sensor data collected by one or more sensors in a wellsite construction rig, determining a data quality of the measured sensor data based on a plurality of data quality dimensions, predicting predicted sensor data using a model, comparing the measured sensor data with the predicted sensor data, determining an uncertainty of the measured sensor data based at least in part on the data quality and the comparison, and selecting one or more workflows for implementation using the one or more sensors, the wellsite construction rig, or both.

Embodiments of the disclosure include a computing system including one or more processors, and a memory system comprising one or more non-transitory computer-readable media storing instructions that, when executed by at least one of the one or more processors, cause the computing system to perform operations. The operations include receiving measured sensor data collected by one or more sensors in a wellsite construction rig, determining a data quality of the measured sensor data based on a plurality of data quality dimensions, predicting predicted sensor data using a model, comparing the measured sensor data with the predicted sensor data, determining an uncertainty of the measured sensor data based at least in part on the data quality and the comparison, and selecting one or more workflows for implementation using the one or more sensors, the wellsite construction rig, or both.

Embodiments of the disclosure include a non-transitory computer-readable medium storing instructions that, when executed by at least one processor of a computing system, cause the computing system to perform operations. The operations include receiving measured sensor data collected by one or more sensors in a wellsite construction rig, determining a data quality of the measured sensor data based on a plurality of data quality dimensions, predicting predicted sensor data using a model, comparing the measured sensor data with the predicted sensor data, determining an uncertainty of the measured sensor data based at least in part on the data quality and the comparison, and selecting one or more workflows for implementation using the one or more sensors, the wellsite construction rig, or both.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
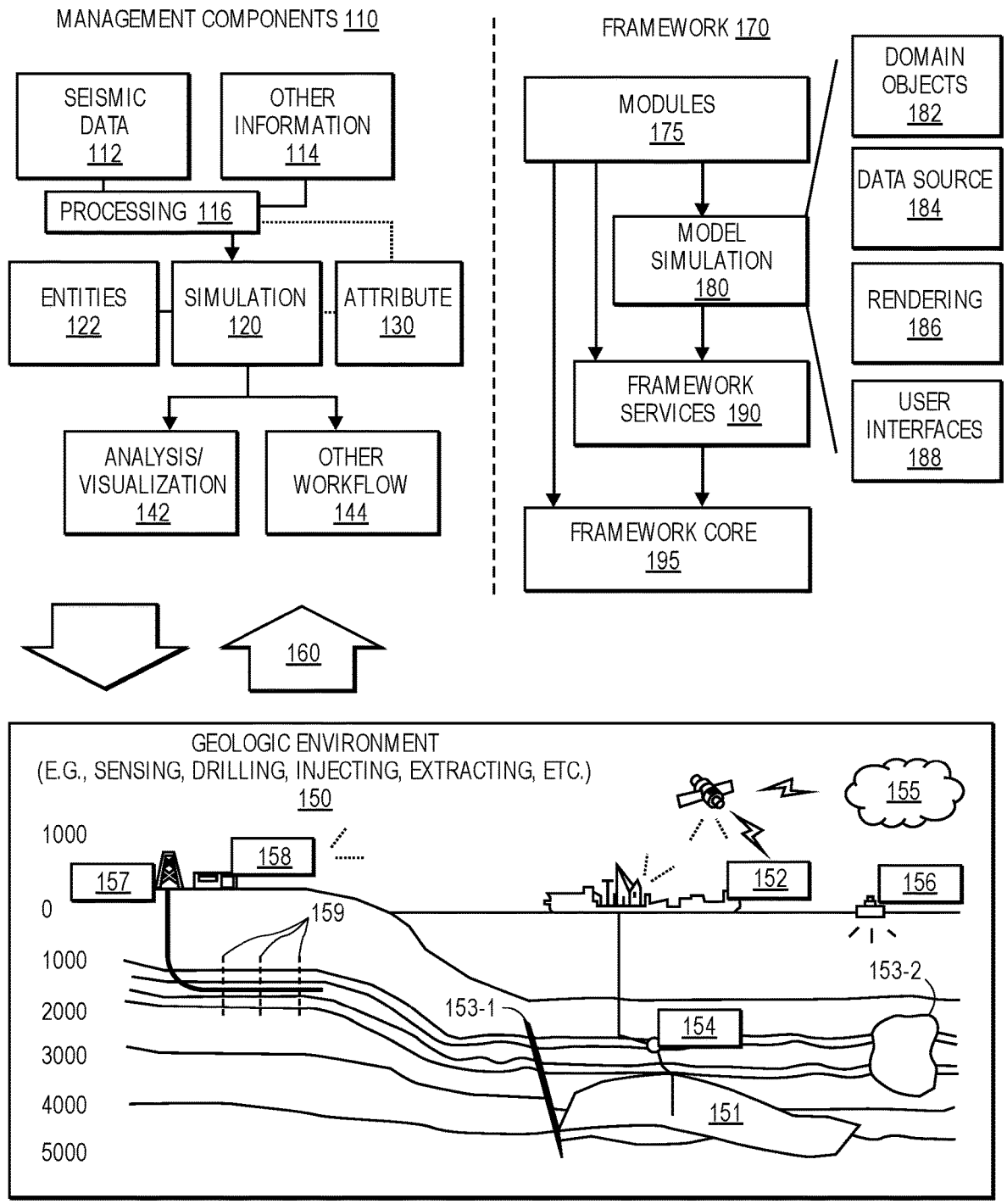
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT' reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
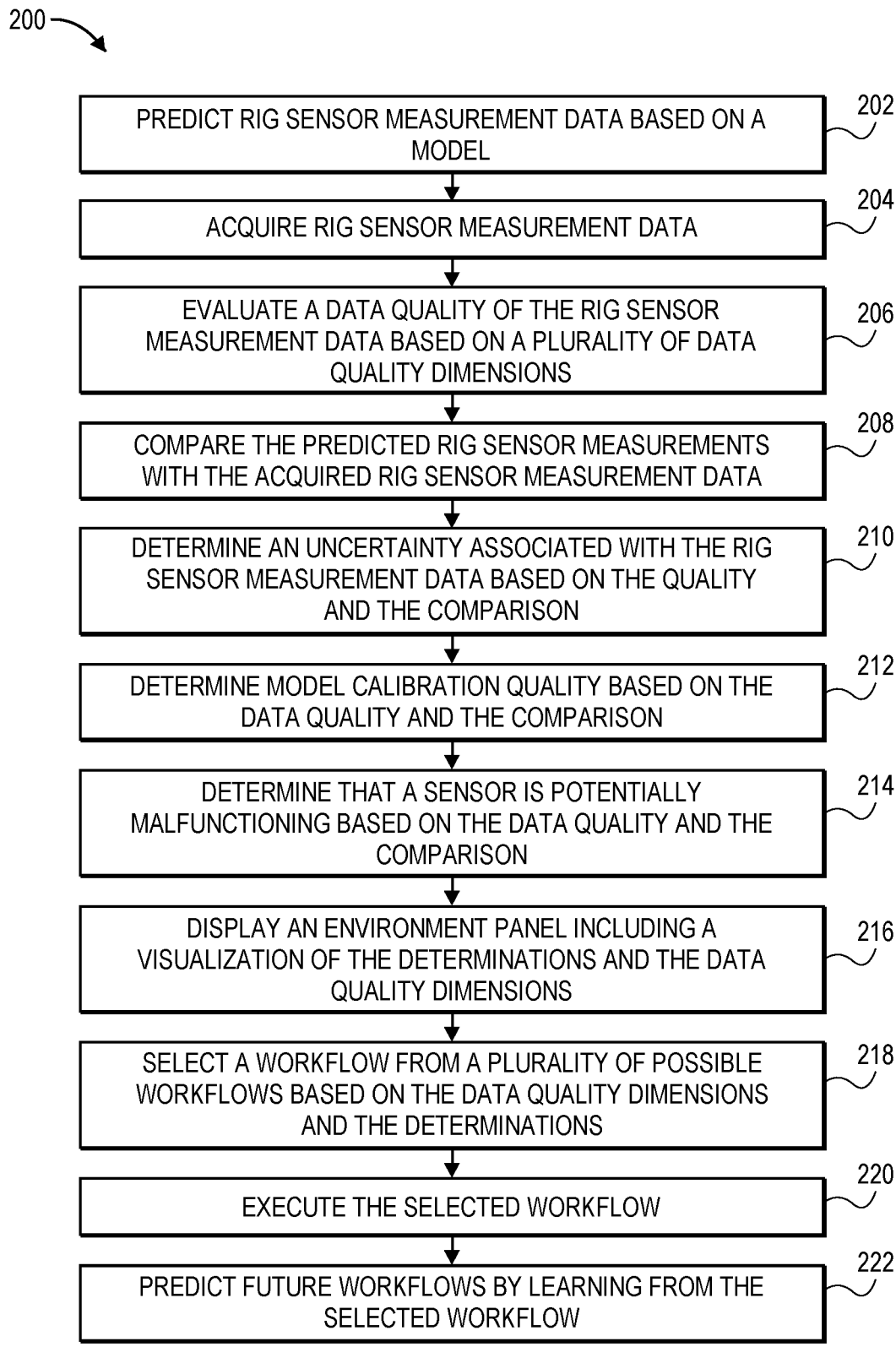
FIG. 2 illustrates a flowchart of a method for conducting wellsite activities, according to an embodiment.

FIG. 2 illustrates a flowchart of a method 200 for conductive wellsite activities, e.g., using a wellsite construction system or "rig", according to an embodiment. A wellsite constructions system may include one or more drilling rigs, whether offshore or onshore, and/or any other equipment or machines employed for well drilling, construction, completion, production, etc. The wellsite activities may be conducted according to one or more workflows, and the method 200 may be configured to select, adjust, switch, order, etc., such workflows.

The method 200 may include the use of one or more models that describe a downhole or rig environment or parameter. Such models may be constructed as part of the method 200 or otherwise obtained for use in the method 200. An individual model may include several realizations, and may provide a range of probable values for a given condition, e.g., parameter or measurement value. In some embodiments, several such models (or groups of models) may be implemented to predict several parameters. For example, as shown, the method 200 may include predicting rig sensor measurement data based on the model, as at 202. In one specific embodiment, the rig sensor measurement may be standpipe pressure (SPP), as will be discussed below. In other embodiments, weight on bit, hookload, speed, or any other rig sensor measurement may be predicted using a model.

The method 200 may further include acquiring (measured) rig sensor measurement data, as at 204. This acquired rig sensor measurement data may be gathered using one or more physical sensors deployed in or at the wellsite as part of the wellsite construction system. Such sensors may include pressure sensors, speed sensors, accelerometers, temperature sensors, and others, deployed at the surface and/or in the well.

The method 200 may include evaluating a data quality of the rig sensor measurement data based on a plurality of data quality dimensions, as at 206. Data quality dimensions may include, for example, completeness, uniqueness, timeliness, validity, accuracy, and consistency, among potentially others. Completeness may be measured as the portion of stored or received data over the expected size of the complete dataset. Thus, missing channels or missing contextual information about the data channels may represent incomplete data, e.g., a reduction in the completeness dimension of data quality.

Data uniqueness may be based on the notion that data is not required more than once, and may be measured as the percentage of unique data that is stored or received against the total amount of data that is stored or received. For example, measurements received from multiple sources may provide different information, or redundant information. To avoid giving one data set too much weight, such redundant data might, for example, be given a lower weight or ignored.

The timeliness data quality dimension measures the degree to which data represents a given point in time. This is measured as the percentage of on time data stored or received against the total amount of data that is stored or received. Data arriving too late or out of order may reduce the timeliness data dimension.

The validity data quality dimension is based on whether the data conforms to an expected syntax, e.g., format, type, range, as prescribed in its definition. The measurement is the percentage of valid data stored or received against the total amount of data stored or received. Examples of invalid data include data that is out of range or configured with the wrong (i.e., not prescribed or otherwise unexpected) units.

The accuracy dimension expresses the degree to which the data correctly described the object or event. The measurement may be the percentage of accurate data stored or received against the total stored or received. Data that might be excluded from accurate data, thereby lowering the accuracy dimension value, might include data signals with high standard deviations or incoherent spikes.

The consistency dimension expresses the absence of difference, when comparing two or more representations of a thing against a definition. This may be quantified as the percentage of consistent data stored or received against the total amount of data stored or received. For example, a pump speed (e.g., strokes per minute or SPM) dropping to zero when standpipe pressure remains constant reflects inconsistent data. As another example, a bottom-hole assembly showing no measuring-while-drilling tool when the channel from this tool is being received may be indicative of an inconsistent data.

Any one or more of these data quality dimensions may be taken into consideration to evaluate rig sensor measurement data at 206. If the score is below a threshold, either as a composite or for the individual data quality dimensions, adjustments may be made or suggested, e.g., in response to of flags, warnings, exceptions, etc. Further, the presence of a low score in any of the dimensions may be displayed to a user to initiate a workflow adjustment or selection.

Thus, low quality alone may be sufficient to induce an alarm, but may also provide insight into the veracity of the sensor measurement when compared to model predictions, as will be described below. Accordingly, the method 200 may include comparing the predicted rig sensor measurement data with the acquired rig sensor measurement data, as at 208. As noted above, the rig sensor measurement data may be of varying degree of quality, and thus adjustments to the model might be called for based on a discrepancy between the predicted measurement data and the rig measurement data, or the sensor(s) used to collect the data may be collecting low-quality data, and that may explain the discrepancy.

The method 200 may thus proceed to determining an uncertainty associated with the rig sensor measurement data based on the quality that was evaluated and the comparison with the collected data, as at 210. Model calibration quality may then be determined based at least in part on the data quality and the comparison, as at 212. Additionally or alternatively, a potential sensor malfunction may be determined based on the data quality and the comparison, as at 214. In other words, the combination of the data quality and the discrepancy may determine whether the model should be updated, or the sensor is likely malfunctioning, or both. For example, if the data quality is low, it may be determined that the sensor is malfunctioning. If the data quality is high, it may be more likely that the model should be adjusted, e.g., depending on the size of the discrepancy. In some embodiments, a machine learning model may be trained to receive the data quality dimension values as inputs, as well as the predicted and measured data (and/or the comparison thereof) in order to predict whether the model is poorly calibrated or the sensor is faulty, or both. Further, the machine learning model may be trained to make a workflow selection based on this determination, in at least some embodiments, as will be described in greater detail below.

Figure 3:
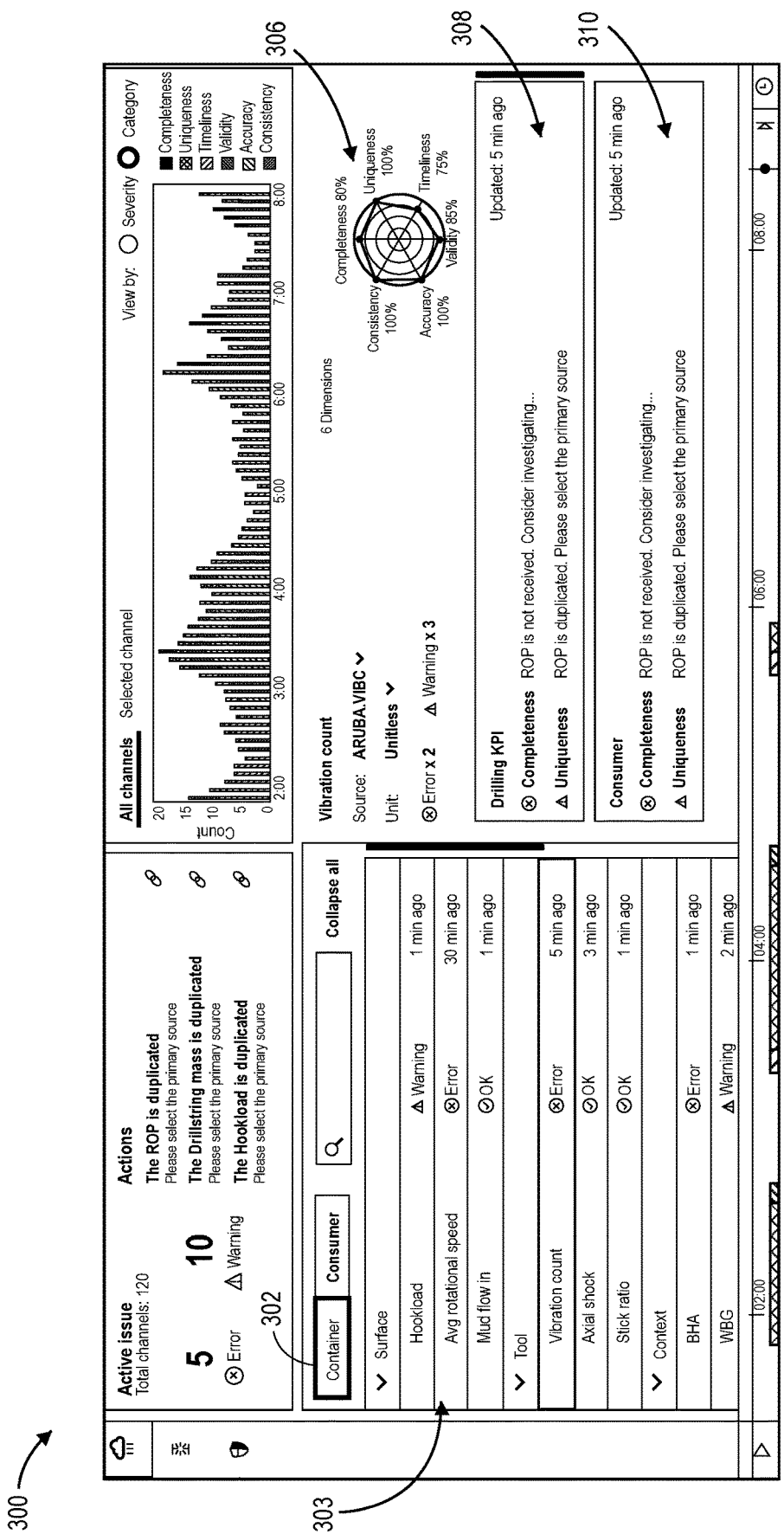
FIG. 3 illustrates a view of an environmental dashboard, according to an embodiment.
Figure 4:
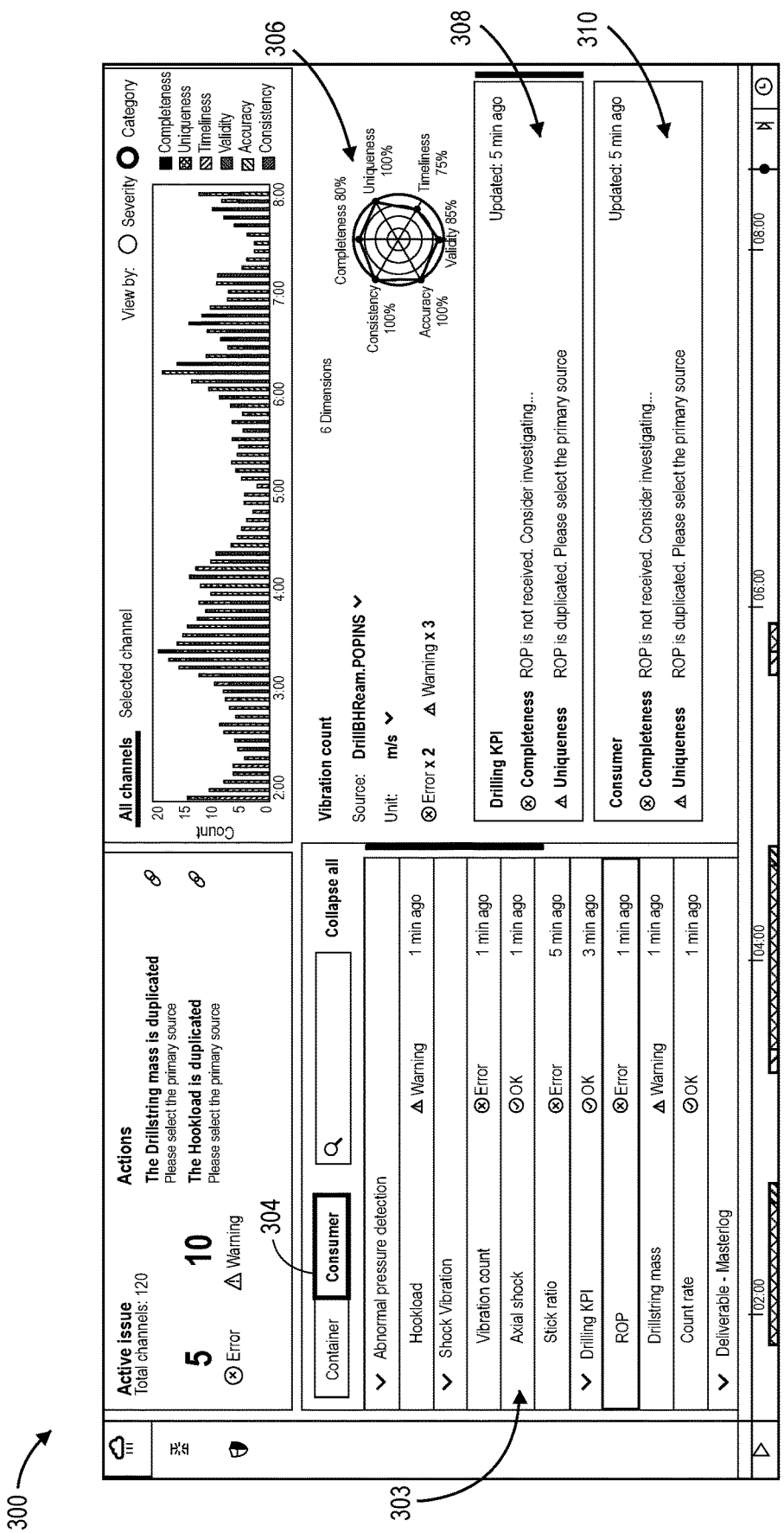
FIG. 4 illustrates another view of the environmental dashboard, according to an embodiment.

The method 200 may further include displaying an environment panel including a visualization of the determinations and the data quality dimensions, as at 216. FIGS. 3 and 4 illustrate two examples of such an environmental panel 300, according to an embodiment. In FIG. 3, a container option 302 is selected, which shows a status of the individual sensors in box 303. For example, surface sensors may provide measurements of hookload, speed, and mudflow, while tool (e.g., BHA) sensors may provide vibration counts, shocks, and stick ration measurements. Context indicators may also be provided, showing the status of, for example, the BHA signals. In FIG. 4, a consumer option 304 is selected. For example, in the consumer option 304, drilling key performance indicator (KPI) information may be displayed in box 303.

The environmental panel 300 may also display the data quality dimension scores 306 for individual sensor measurements. Further, the panel 300 may specify warnings and errors in boxes 308, 310, while suggesting workflows to be implemented in response. For example, as shown in both FIGS. 3 and 4, the present state of the rig data acquisition system indicates that the ROP channel is not being received, despite the fact that multiple sources are selected. As such, both completeness and uniqueness scores for the ROP signal are diminished. In each case, a workflow is suggested. For example, to mitigate the completeness error, investigation into the signal is suggested. To rectify the uniqueness issue, the primary source for the ROP can be selected. Because the data quality in at least one dimension is low, the method 200 did not conclude that the model for ROP should be updated, but rather that the signal was of too poor quality to be trusted, and therefore did not select a workflow for adjusting the model, but of correcting the channel selection and/or investigating issues with the sensors that provide ROP data.

Returning to FIG. 2, the method 200 may include selecting a workflow from a plurality of possible workflows based at least in part on the data quality dimensions (i.e., the values for such dimensions) and the determinations, as at 218. Such selection may be manual, based on outputs provided to the user via the environment panel 300 and inputs received from the user into the environment panel 300. That is, the environment panel 300 may provide a user interface for interacting with a human operator to control rig activities. The environment panel 300 may, for example, simply display errors based on data quality, predictions from the parameter model(s), or both. In other embodiments, the environment panel 300 may execute the aforementioned machine learning model, which may predict and/or initiate workflows based on the data quality, model(s), or both.

Figure 5:
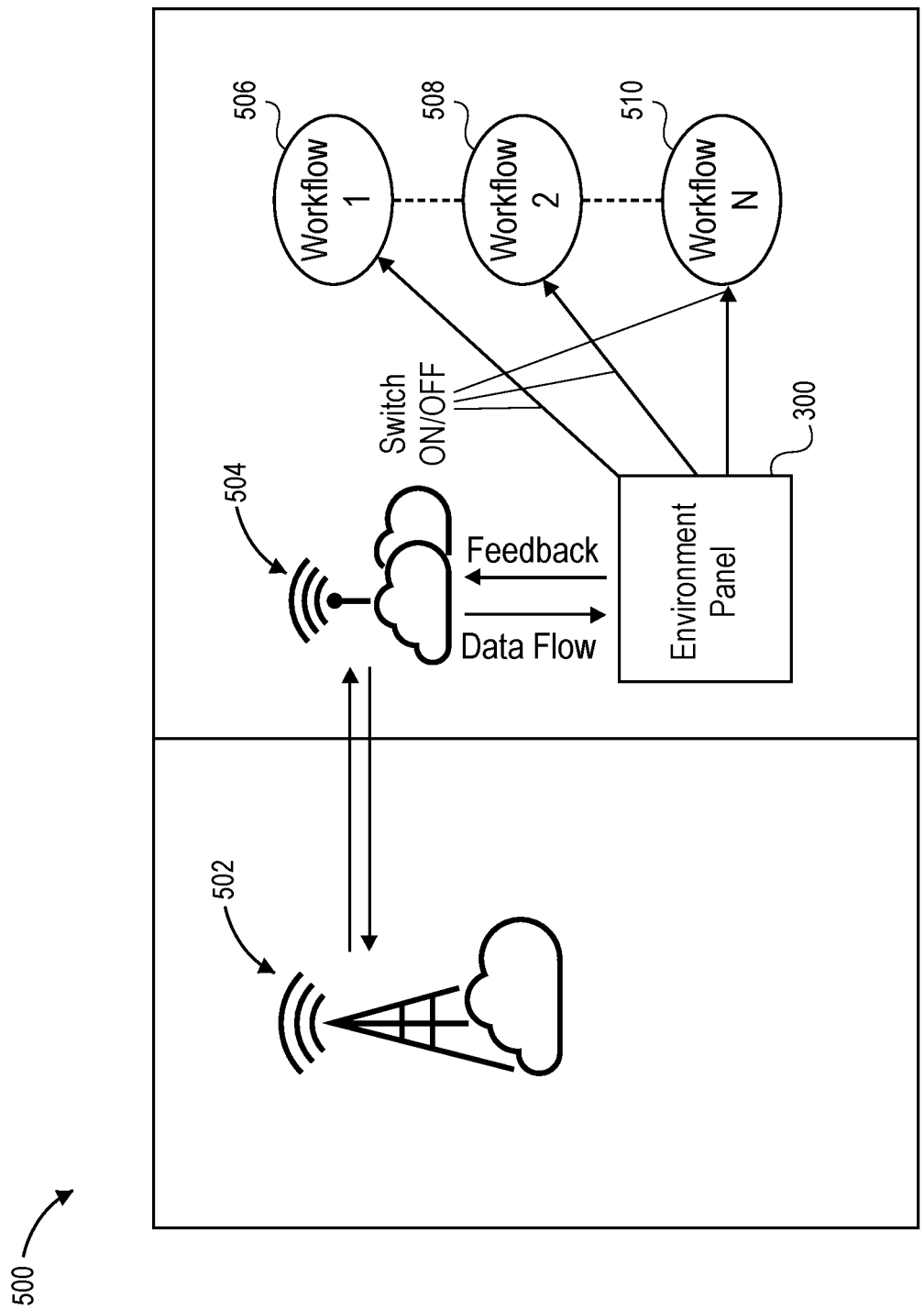
FIG. 5 illustrates a diagrammatic view of a wellsite system, according to an embodiment.

FIG. 5 illustrates a schematic view of a rig control system 500, according to an embodiment. As shown, the system 500 may include a drilling rig 502, including sensors and drilling equipment, among other things. The sensors may collect data, which may be transmitted to a control center 504. The control center 504 may be remote from the drilling rig 502, or may be located nearby or at the wellsite. The control center 504 may be responsible for directing drilling activities at the rig 502. Accordingly, the control center 504 may provide data to the environment panel 300, which may provide a user-interface, as discussed above. The panel 300 may also permit or implement selection of one or more workflows 506, 508, 510 (as well as a non-selection of other workflows) based on the sensor data, the data quality of the sensor data, and the model. In other words, the environment panel 300 may permit for the switching on or off of the workflows 506, 508, 510.

The workflows 506-510 may include tasks related to the quality of measurements, e.g., selected in response to data quality being low in one or more dimensions. Workflows 506-510 may include data filtering for common measurements, models of interconnections between measurements, Bayesian links between measurements in real-time to assess the quality of measurements, analysis of outputs of monitoring schemes to detect and flag outliers, constant probabilistic evaluation of the quality of the measurement.

The workflows 50-510 may depend at least in part on data received from the rig 502. For example, a workflow may be a kick detection alarm workflow that uses pressure data and sensor data representing levels of fluid in one or more mud pits at the rig. Other alarms, and other workflows, may also be supported.

The environmental panel 300 may also monitor for data quality issues from the rig. In one embodiment, the response to detecting a data quality issue, the panel 300 may turn a workflow 506 on or off. For example above, in drilling contexts, drilling fluid (mud) is circulated into the wellbore by pumping the mud from a storage structure, generally referred to as a "mud pit." The fluid levels in the mud pit may be monitored via one or more sensors. The environmental panel 300 may determine that the quality of the data representing the fluid levels in a mud pit are low. This may mean that the data (or a certain amount of the data) is missing. It may be that the data fails one or more data validation/data quality checks. For example, if the reported level of the fluid exceeds the total reported capacity of the pit, this may indicate that the data is suspicious. Or, for example, if the data is a negative number, this may indicate a problem since a pit cannot have a negative volume of fluid.

In such instances, the environmental panel 300 may alert the operations team that there is a potential data quality issue that the team needs to investigate. It may be, for example, that the reason the measured volume exceeds the total capacity is because of a misconfiguration where different units are used for measured volume and for total capacity volume. The environmental panel may identify the data quality issue. It may also be configured to determine a likely cause of the error and suggest one or more steps that the user can take to resolve it.

The environmental panel 300 may also turn one or more of the workflows 506-510 on or off based on the data quality determination. For example, the environmental panel 300 may disable kick event alarms and/or other alarms that rely on those data channels until the data quality is above a specified threshold. The environmental panel 300 may prompt a user for authorization to deactivate one or more workflows. The environmental panel 300 may turn the workflows off automatically and notify the user of its actions and the reasoning.

In another embodiment, the environmental panel 300 may label workflows 506-510 using data that fails to meet data quality criteria as "suspect." In such an embodiment, the environmental panel 300 may allow the workflows 506-510 to run, but may flag alarms or results of the workflows 506-510 as requiring user validation before providing the output of the workflows 506-510.

In another embodiment, one or more workflows may operate in parallel to identify or address a particular concern. For example, the workflows 506-510 may each be kick detection algorithms that use different algorithms and/or data readings to identify a kick. In such an embodiment, the environmental panel may dynamically assign a priority and/or quality score to the different workflows. In such an embodiment, the environmental panel 300 may provide the score to the user or indicate to the user a ranking of the alarms based on the data quality.

Returning again to FIG. 2, the method 200 may include executing the selected (or switched "on") workflow(s), as at 220. These may be performed to increase data quality, calibrate the model, or both. Executing a selected one or more of the workflows 506-510 may include conducting physical operations according to the workflow(s) selected 506-510. For example, the rig sensors may be adjusted or investigated, in response to the sensor data being potentially faulty. In another example, the wellsite construction equipment (e.g., rig pumps, mechanical equipment, electric equipment, etc.) may be adjusted, e.g., operating parameters changed, or may be fixed or maintained, etc.

Moreover, the method 200 may include predicting future workflows by learning from the selected workflow, as at 222. This may be implemented using a machine learning model as supervised learning, in which a user selects a workflow, and the model learns to predict what the user would selected based on the input. In another embodiment, the model may learn from the efficacy of its own predictions, i.e., at least partially unsupervised. For example, if filtering of data is selected as the workflow, the model may reevaluate the data quality after the filter is implemented. If the filter increased data quality and resulted in agreement with the model, a confidence of this being the correct choice may be increased. If not, the confidence may be lowered. In either case, two or more workflows may be likewise evaluated, with the results stored and used for building confidence in future selections based on the model.

Figure 6:
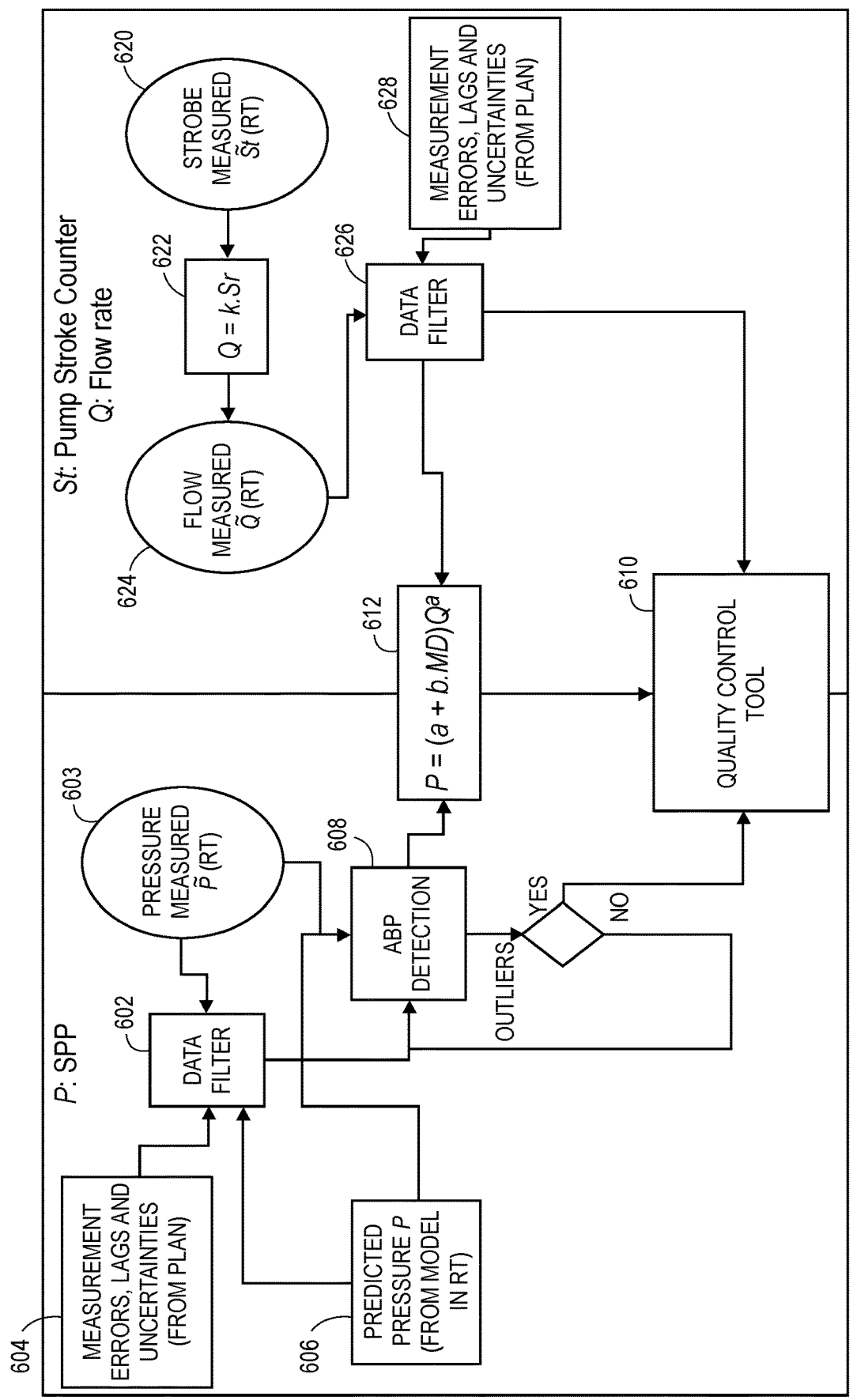
FIG. 6 illustrates a diagrammatic view of a system for implementing an embodiment of the method of FIG. 2, according to an embodiment.

FIG. 6 illustrates a flowchart of an abnormal pressure detection system, according to an embodiment. The system 600 may implement the method 200, according to a specific embodiment related to standpipe pressure. As shown, the system 600 may include a data filter 602, which may receive measurement data 603 that may have quality issues such as errors, lagging, and uncertainties, as represented at 604. The data filter 602 can also receive predicted parameters 606, in this case pressure, from a model of the parameter in real-time (RT). The data filter 602 may remove outlier data points, noise, etc., depending on the data filtering algorithm or structure used.

The system 600 may also include an abnormal pressure detection module (ABP) 608. The ABP 608 may receive the filtered data from the data filter 602, and/or the measured pressure 603 in order to detect abnormal data, e.g., data that departs from the modeled data by more than a threshold or otherwise reflects low quality, as determined according to the data quality dimensions discussed above. If outliers are recognized, they may be sent to a quality control tool 610. Otherwise, the measured, filtered, quality-checked pressure data may be sent to a pressure model module 612.

The system 600 may also measure pump parameters for the standpipe pressure. For example, the system 600 may receive stroke rate measurements as at 620. The flow rate may be predicted via calculations from the stroke rate measurements using a model 622. The flow rate may also be directly measured at 624, and thus a comparison of the measurements at 620 and 624 may be made in order to verify the functioning of the sensors, requirement to update the model 622, or both. A data filter 626 may be implemented to detect measurement errors, lags, and uncertainties and remove these from the measurement data. The filtered measurements may be fed to the model module 612, which may relate the flow rate measurement with the pressure measurement. The data and the results of the model module 612 may each be fed to the quality control tool 610, which may, e.g., according to the method 200, evaluate discrepancies in the predicted and measured data, and initiate or select workflows in response, e.g., to mitigate such discrepancies.

Figure 7:
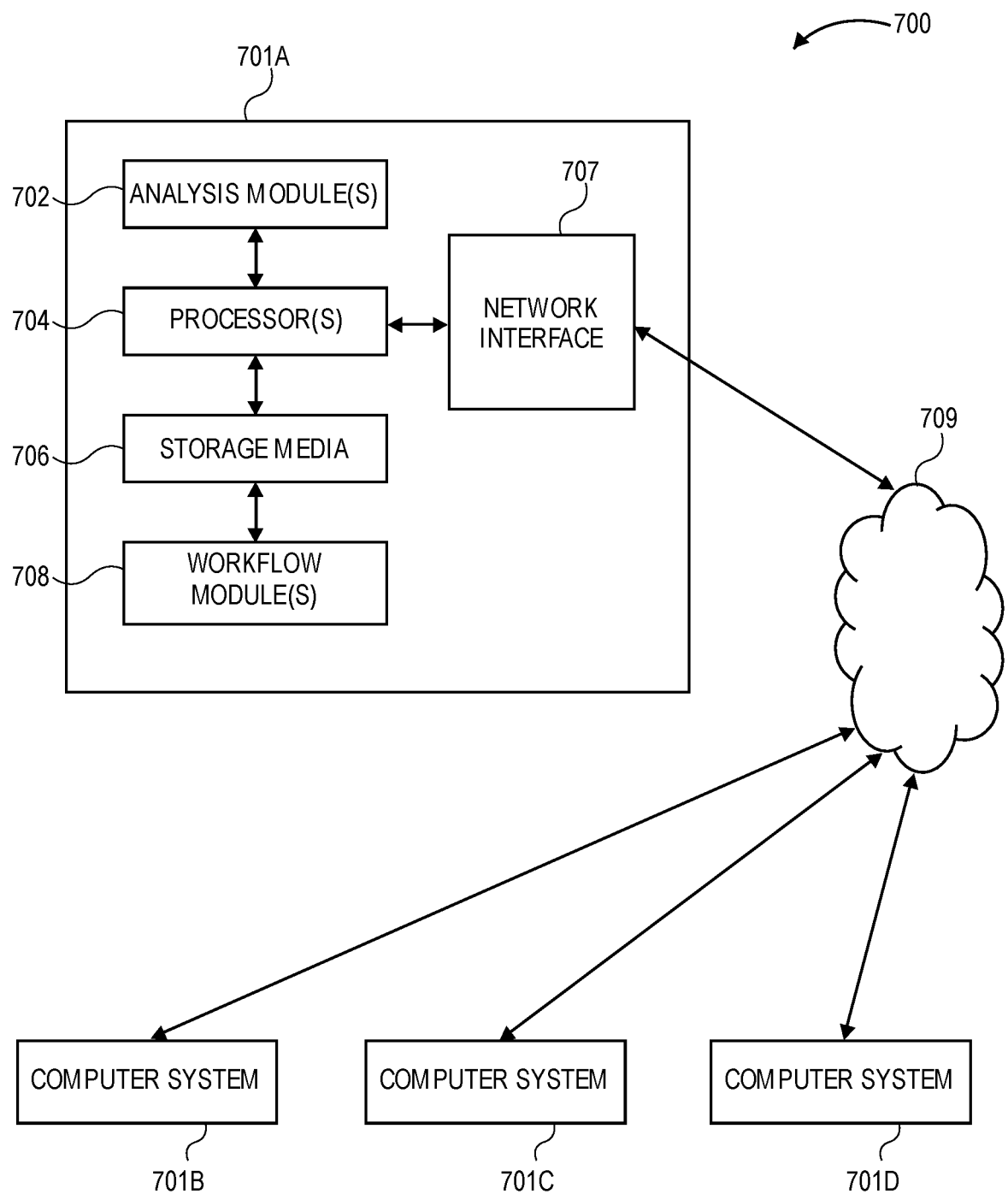
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more workflow module(s) 708. In the example of computing system 700, computer system 701A includes the workflow module 708. In some embodiments, a single workflow module may be used to perform some aspects of one or more embodiments of the methods disclosed herein. In other embodiments, a plurality of workflow modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for conducting wellsite activities, comprising:
    receiving measured sensor data collected by one or more sensors in a wellsite construction rig;
    determining a data quality of the measured sensor data based on a plurality of data quality dimensions;
    predicting predicted sensor data using a model;
    comparing the measured sensor data with the predicted sensor data;
    determining an uncertainty of the measured sensor data based at least in part on the data quality and the comparison;
    selecting one or more workflows for implementation using the one or more sensors, the wellsite construction rig, or both, wherein selecting comprises:
        displaying an alert to a user that an error related to the data quality is detected;
        receiving a selection of the one or more workflows from the user; and
        using the received selection to train a machine learning model to predict a subsequent selection of the one or more workflows; and
    executing the one or more workflows, wherein executing the one or more workflows comprises generating and transmitting a signal that causes equipment or the one or more sensors of the wellsite construction rig to be adjusted.

2. The method of claim 1, wherein the plurality of data quality dimensions are selected from the group consisting of: completeness, uniqueness, timeliness, validity, accuracy, and consistency.

3. The method of claim 1, wherein the one or more workflows include modifying the model that was used to predict the predicted sensor data, investigating a suspected malfunction of the one or more sensors, or both.

4. The method of claim 1, further comprising filtering the measured sensor data in response to the data quality, wherein filtering comprises at least one of filtering for common measurements, comparing the measured sensor data with an interconnection model between two or more different types of measurements, Bayesian links between measurements in real-time to assess the quality of measurement sensor data, analysis of outputs of monitoring schemes to detect and flag outliers, or probabilistic evaluation of the data quality of the measured sensor data.

5. The method of claim 1, wherein executing the one or more workflows comprises adjusting the equipment or the one or more sensors of the wellsite construction rig.

6. A computing system, comprising:
    one or more processors; and
    a memory system comprising one or more non-transitory computer-readable media storing instructions that, when executed by at least one of the one or more processors, cause the computing system to perform operations, the operations comprising:
        receiving measured sensor data collected by one or more sensors in a wellsite construction rig;
        determining a data quality of the measured sensor data based on a plurality of data quality dimensions;
        predicting predicted sensor data using a model;
        comparing the measured sensor data with the predicted sensor data;
        determining an uncertainty of the measured sensor data based at least in part on the data quality and the comparison;
        selecting one or more workflows for implementation using the one or more sensors, the wellsite construction rig, or both, wherein selecting the one or more workflows comprises automatically selecting the one or more workflows without user input using a trained machine learning model; and
        executing the one or more workflows, wherein executing the one or more workflows comprises generating and transmitting a signal that causes equipment or the one or more sensors of the wellsite construction rig to be adjusted.

7. The computing system of claim 6, wherein the plurality of data quality dimensions are selected from the group consisting of: completeness, uniqueness, timeliness, validity, accuracy, and consistency.

8. The computing system of claim 6, wherein the one or more workflows include modifying the model that was used to predict the predicted sensor data, investigating a suspected malfunction of the one or more sensors, or both.

9. The computing system of claim 6, wherein the trained machine learning model is trained based on an efficacy of the one or more workflows selected.

10. The computing system of claim 6, wherein the operations further comprise filtering the measured sensor data in response to the data quality, wherein filtering comprises at least one of filtering for common measurements, comparing the measured sensor data with an interconnection model between two or more different types of measurements, Bayesian links between measurements in real-time to assess the quality of measurement sensor data, analysis of outputs of monitoring schemes to detect and flag outliers, or probabilistic evaluation of the data quality of the measured sensor data.

11. The computing system of claim 6, wherein executing the one or more workflows comprises adjusting the equipment or the one or more sensors of the wellsite construction rig.

12. A non-transitory computer-readable medium storing instructions that, when executed by at least one processor of a computing system, cause the computing system to perform operations, the operations comprising:
    receiving measured sensor data collected by one or more sensors in a wellsite construction rig;
    determining a data quality of the measured sensor data based on a plurality of data quality dimensions;
    filtering the measured sensor data in response to the data quality, wherein filtering comprises at least one of filtering for common measurements, comparing the measured sensor data with an interconnection model between two or more different types of measurements, Bayesian links between measurements in real-time to assess the quality of the measured sensor data, analysis of outputs of monitoring schemes to detect and flag outliers, or probabilistic evaluation of the data quality of the measured sensor data;

predicting predicted sensor data using a model;

comparing the measured sensor data with the predicted sensor data;

determining an uncertainty of the measured sensor data based at least in part on the data quality and the comparison;

selecting one or more workflows for implementation using the one or more sensors, the wellsite construction rig, or both; and executing the one or more workflows, wherein executing the one or more workflows comprises generating and transmitting a signal that causes equipment or the one or more sensors of the wellsite construction rig to be adjusted.

13. The medium of claim 12, wherein the plurality of data quality dimensions are selected from the group consisting of: completeness, uniqueness, timeliness, validity, accuracy, and consistency.

14. The medium of claim 12, wherein the one or more workflows include modifying the model that was used to predict the predicted sensor data, investigating a suspected malfunction of the one or more sensors, or both.

15. The medium of claim 12, wherein selecting comprises:

displaying an alert to a user that an error related to the data quality is detected;

receiving a selection of a workflow from the user; and using the received selection to train a machine learning model to predict a subsequent selection of the one or more workflows.

* * * * *